United States Patent [19]

Middleton et al.

[11] Patent Number: 4,527,601

[45] Date of Patent: Jul. 9, 1985

[54] FUEL TANK INLET RESTRICTOR

[75] Inventors: Jerry L. Middleton, West Bloomfield; Richard H. Bienick, Walled Lake, both of Mich.

[73] Assignee: Chrysler Corporation, Highland Park, Mich.

[21] Appl. No.: 531,117

[22] Filed: Sep. 12, 1983

[51] Int. Cl.³ ............................................... B67C 3/34
[52] U.S. Cl. .............................. 141/348; 220/86 AT; 251/149.2
[58] Field of Search ........................ 141/392, 346-362, 141/286, 331, 344, 311 R; 220/35, 36, 86 R, 86 AT; 251/149.2, 339; 137/351, 588, 592; 280/5 A, 5 R; 296/1 C

[56] References Cited

U.S. PATENT DOCUMENTS 4,248,279  2/1981  Warmbold ........................ 141/348

Primary Examiner—Houston S. Bell, Jr.
Attorney, Agent, or Firm—Kenneth H. MacLean, Jr.

[57] ABSTRACT

An improved fuel filler restrictor assembly including a reinforcing wall member adjacent to the aperture through which a fuel filling nozzle is inserted. The reinforcing wall member is secured to the filler neck restrictor body and extends across the filler tube with opposite edge portions adjacent to the filler tube wall so as to prevent prying of the restrictor assembly by a bar or the like and thereby to prevent removal of the restrictor portion of the assembly by back and forth prying movements by the bar.

3 Claims, 3 Drawing Figures

U.S. Patent  Jul. 9, 1985  4,527,601
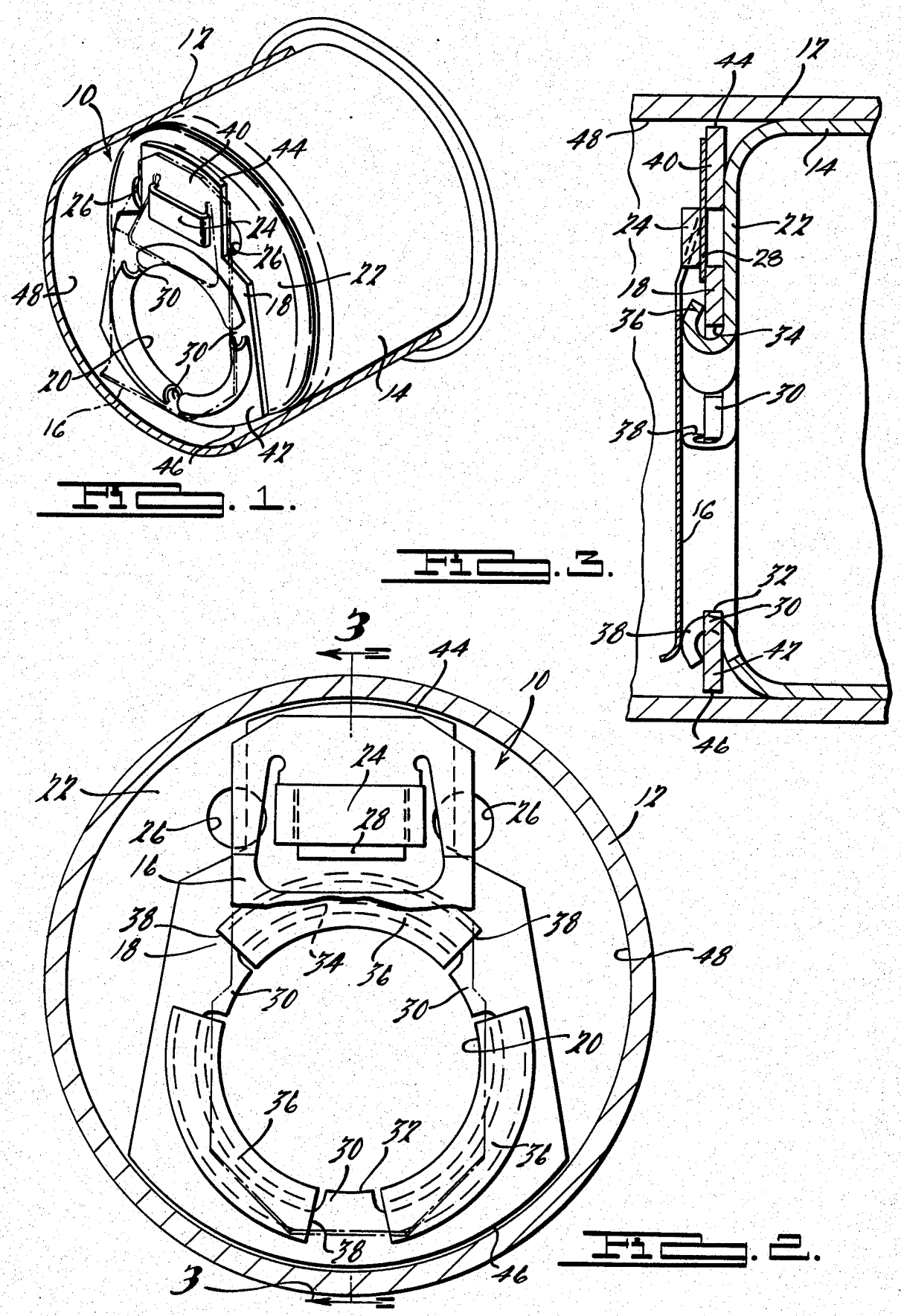

FUEL TANK INLET RESTRICTOR

BACKGROUND OF THE INVENTION

1. Field of Invention

The present invention relates generally to automotive fuel tank filler tubes, more specifically to a restrictor assembly therefore.

2. Description of the Prior Art

With the introduction of catalyst convertors for treating the exhaust gases of internal combustion engines, federal standards were proclomated which were intended to inhibit the filling of fuel tanks of automobiles equipped with such converters with leaded fuel. This was because leaded fuel renders the catalytic converters permanently ineffective. Among the standards is one limiting the amount of leaded fuel that could be delivered to the tank of a converter-equipped automobile to 700 cubic centimeters of fuel be for an automatic shut-off mechanism of a filling nozzle actuates to block flow. Another companion standard provides that the tubular nozzles for unleaded fuel shall not exceed 0.85 inch in diameter and the nozzles for leaded fuel shall not be less than 0.93 inch in diameter.

One industry response to these standards has been to install inlet restrictor assemblies in the fuel filler tube including a spring-loaded movable door normally closing an inlet aperture sized to permit insertion of only an unleaded nozzle for opening the door. U.S. Pat. No. 4,034,784 and U.S. Pat. No. 4,185,844 and U.S. Pat. No. 4,248,279 are relevant to this subject. These patents are assigned to the assignee of the present invention and are exemplary of such assemblies.

In particular, the U.S. Pat. No. 4,248,279 discloses a restrictor inlet with a correctly sized aperture for insertion of only a non-leaded fuel nozzle. To prevent drilling or reaming the aperture for insertion of a larger nozzle, the patent discloses the use of a hardened metal ring in association with the aperture forming portions of the assembly to prevent this enlarging of the opening. It has been found that the hardened metal ring is very effective in preventing enlargement of the aperture.

The present application also utilizes a hard metal member to prevent enlargement of the aperture by drilling or reaming. In addition, the subject improved assembly utilizes a hardened metal reinforcing wall which in addition to the aperture forming portion includes portions extending to opposite sides of the filler tube wall. The reinforced hardened metal wall member of the filler assembly prevents destruction of the aperture forming portions of the assembly by insertion of a pry bar or the like into the aperture and subsequent back and forth working of the assembly which can result in breakage of the end portion forming the aperture. It is desirable that the end portion of the filler assembly be resistant to damage and resultant removal by prying with a bar or like tool.

SUMMARY OF THE INVENTION

In response to the potential damage which can be caused to filler assemblies by prying, the subject application provides an improved reinforced filler assembly configured to greatly limit the damage which can be caused by prying the end portion of the assembly with a bar or the like. The object of the improved reinforced filler assembly is to prevent damage thereto which would permit insertion of a larger leaded type nozzle of a fuel pump and therefore prevention of the use of leaded fuel in engines utilizing catalytic converters.

According to the feature of the present invention, a hardened reinforced wall member is attached to the end of the filler restrictor assembly and has portions encircling the aperture forming portion to prevent drilling or reaming, further portions extend adjacent to the wall portions of the filler tube to prevent back and forth prying movements of portions of the filler tube assembly caused by insertion of a bar or the like and a force exerted thereon to subsequently defeat the object of breaking the end portion of the filler tube assembly so that a larger leaded nozzle of a fuel pump can be inserted.

BRIEF DESCRIPTION OF THE DRAWINGS

The aforementioned objects and features of the invention will become apparent to those skilled in the art upon reading the detailed description which follows, reference being had to the accompanying drawings in which:

FIG. 1 is a perspective view of the filler tube restrictor assembly of the present invention as installed in a fuel tank filler tube;

FIG. 2 is an enlarged rear-end view of the improved restrictor assembly; and

FIG. 3 is a cross-sectional view taken along section line 3—3 in FIG. 2.

DESCRIPTION OF THE PREFERRED EMBODIMENT

Turning now to the drawings, in particular to FIG. 1 thereof, a restrictor assembly 10 is illustrated as being installed in the outer end of fuel filler tube 12. It is well known in the art that such filler tubes are normally joined to a convenient automobile body panel adjacent the outer end and are inserted into the vehicle' fuel tank. It is felt that this mounting arrangement is so well known to those skilled in the art that no further description or illustration is necessary.

The subject restrictor assembly 10 is illustrated as generally comprising a cup-shaped body member 14 to which are secured a restrictor door member 16 and a reinforcing member 18.

The body member 14 is preferably formed as an elongated formable sheet metal member that may be secured as by welding, within the filler tube and including an axially extending fuel nozzle receiving aperture 20 (to be later more fully described) formed through its inner wall 22 and a tab receiving slot 24 formed, as by stamping, through the same wall 22. Vent holes 26 are also preferably formed along the wall 22 to facilitate filling.

The restrictor door member 16 is preferably a resilient metallic member of known design and includes tab portion 28 received in the slot 24 whereby it is fixed to the body member 14 in a position normally affecting closure of the fuel nozzle receiving aperture 20.

The aperture 20 is sized to permit the insertion of the fuel delivery nozzles for unleaded fuel (where nozzles may not exceed 0.85 inch in diameter) to displace the restrictor door member 16 and permit filling the vehicle fuel tank. It is further sized to prevent such insertion of fuel delivery nozzles for leaded fuel (where nozzles may not be less than 0.93 in diameter). This sizing is accomplished through the cooperation of the body member 14 and the reinforcing member 18 which it is formed to retain.

The reinforcing member 18 is preferably formed as a flat wall member with an opening there through from metal which exhibits hardness in at least the range of RC58-62. It includes a plurality of radially inwardly extending circumferentially space projections 30 which define a hardened limiting diameter indicated at 32 for the fuel nozzle receiving aperture 20. An inner diameter surface 34 of the reinforcing member 18 is sized so that the circumferentially arrayed portions 36 of the inner wall 22 of the body member 14, which are spaced by radially extending slots 38 registering with the projections 30, may be mechanically formed to retain the reinforcing member 18 while defining the remainder of the aperture 20 between the projections 30. Since the inner diametral surface 34 the thickness of the inner wall 22 of the body member 14 are chosen so that hardened surface 34 is less than the 0.93 inch minimal diameter of leaded fuel nozzles, it should be clear that modification of the inventive restrictor assembly 10 to permit unwanted filling of vehicles with unleaded fuel nozzles is severely hampered.

So far, the description of the filler tube restrictor also corresponds to the restrictor assembly found in U.S. Pat. No. 4,248,279 which is believed to be the closest art. However, it has been found that in a limited number of instances, the restrictive nature of the inlet assembly has been defeated by the insertion of a bar or the like through the aperture 20 of the device shown in the U.S. Pat. No. 4,248,279. Subsequently, up and down or back and forth movements of the bar tend to cold work the inner wall or end 22 of the filler assembly which in a relatively short period of time will cause the inner wall 22 to separate from the remaining portion of the cup-shaped member 14. Thereafter, the broken away portion of the filler tube assembly including the reinforcing portions thereof and the restrictor door fall downward through the tube and into the fuel tank. Thereafter, the larger diameter leaded fuel nozzle can be inserted into the filler tube and leaded fuel can be pumped into a fuel tank for the vehicle which includes a catalytic converter therefore eventually destroying the effectiveness of the catalytic converter.

The subject improved filler tube restrictor of the present application includes an extended upper portion 40 and lower portion 42 of the reinforcing member so that edge portions thereof 44 and 46 respectively extend closely adjacent the inner wall surface 48 of the filler tube assembly 12. Resultantly, a reinforced wall member 18 of the subject invention interferes with up and down prying of the inner wall 22 and the attached backup plate 18 by movements of a pry bar extending through aperture 20. This is because up and down movements of a pry bar extending through aperture 20 will cause the immediate interference between the ends 44 and 46 of portions 40 and 42 respectively of the reinforcing wall 18 with the filler tube 12, thereby preventing any substantial movement of the inner wall 22 with respect to the other portions of the filler tube restrictor assembly 14. Without substantial movements between the inner wall portion 22 and the other portions of the restrictor 14, the metal there between is not worked back and forth and does not become brittle and therefore will not readily fracture. This represents a substantial improvement in the security of the small aperture forming assembly to prevent the insertion of a larger leaded type fuel nozzle.

While only one embodiment of the improved filler tube restrictor assembly has been described, others may be possible without departing from the scope of the appended claims.

What is claimed is:

1. A reinforced restrictor assembly for a fuel tank inlet filler tube to prevent the filling of the vehicle fuel tank with a leaded fuel nozzle of a known diameter while permitting filling of the fuel tank with an unleaded fuel nozzle of smaller diameter including reinforcing wall means to prevent any substantial working of the metal forming the restrictor assembly which could be caused by insertion of a pry bar or the like through the fuel receiving aperture and movement of the pry bar back and forth, comprising:
   a cup-shaped housing member fabricated from a relatively weak and readily formable material and with a side wall engaging the filler tube adjacent the end thereof remote from the fuel tank;
   means of said housing member defining an aperture parallel to the axis of the filler tube including an end wall portion extending across the interior of the filler tube and being integrally attached to the side wall portions of the restrictor assembly which engage the inner walls of the filler tube on a first side of the end wall portion;
   closure means carried on said housing member and movable between a normal position subsequently blocking said aperture and a fill position opening said aperture;
   reinforcing wall means extending adjacent to a second side of the end wall portion of the assembly and normally across the interior of the filler tube and having an aperture therethrough cooperating with the end wall to form the fuel receiving aperture of the restrictor assembly;
   the reinforcing wall defining edge portions extending closely adjacent to the inner wall surfaces of the filler tube over a substantial circumferential portion of the filler tube and cooperatively engaging the inner wall surface of the filler tube in response to even slight pry bar induced forces on the end wall of the restrictor assembly thereby preventing any substantial working of the end wall portion with respect to the side wall portions of the cup-shaped housing member.

2. A restrictor assembly as defined in claim 1 wherein said reinforcing wall means is formed of a hardened material and having sufficient strength and rigidity to prevent relative deformations between portions of the cup-shaped housing member.

3. A restrictor assembly as defined in claim 1 in an inlet end of a fuel tank filler tube with the first side of the end wall facing the inlet end;
   the reinforcing wall member having an upwardly extending portion defining an upper edge portion closely adjacent the upper inner wall surface of the filler tube over a substantial circumferential distance to prevent any substantial upward movement between the inner wall member and the edge of the attached reinforcing wall;
   the reinforcing wall member also having a downwardly extending projecting portion defining a lower edge closely adjacent the bottom inner wall of the filler tube over a substantial circumferential portion so as to prevent any substantial downward movement of the inner wall portion of the housing member and the attached reinforcing member by the up and down actions of a pry bar extending through the aperture.

* * * * *